United States Patent [19]

Klein

[11] Patent Number: 5,002,297
[45] Date of Patent: Mar. 26, 1991

[54] LARGE DIAMETER RIGID LIGHTWEIGHT FORK AND STEERING ASSEMBLY FOR BICYCLES

[76] Inventor: Gary G. Klein, 207 S. B. Prairie Rd., Chehalis, Wash. 98532

[21] Appl. No.: 412,822

[22] Filed: Sep. 27, 1989

[51] Int. Cl.[5] ............................................. B62K 21/06
[52] U.S. Cl. ..................................... 280/279; 280/280
[58] Field of Search ............ 280/274, 279, 280, 288.3, 280/281.1

[56] References Cited

U.S. PATENT DOCUMENTS

| | | | |
|---|---|---|---|
| 574,996 | 1/1897 | Jeffery | 280/280 |
| 609,937 | 8/1898 | Kelly | 280/280 |
| 623,832 | 4/1899 | Russell et al. | 280/280 |
| 641,858 | 1/1900 | Halifax | 280/280 |
| 1,947,631 | 2/1934 | Whidden | 280/280 |
| 3,910,600 | 10/1975 | Sprick | 280/280 |
| 4,171,824 | 10/1979 | Foster | 280/294 |
| 4,201,397 | 5/1980 | Matthias | 280/280 |
| 4,466,629 | 8/1984 | Sinyard | 280/279 |
| 4,479,662 | 10/1984 | Defour et al. | 280/281.1 |
| 4,500,103 | 2/1985 | Klein | 280/281.1 |
| 4,541,649 | 9/1985 | Grünfeld | 280/281.1 |
| 4,600,207 | 6/1986 | Zosi | 280/279 |
| 4,621,827 | 11/1986 | Klein | 280/288.3 |
| 4,662,645 | 5/1987 | McMurtrey . | |
| 4,763,957 | 8/1988 | Poehlmann | 301/111 X |
| 4,768,798 | 9/1988 | Reed | 280/281.1 |
| 4,828,285 | 5/1989 | Foret et al. | 280/279 |
| 4,830,390 | 5/1989 | Yamaki et al. | 280/280 |
| 4,889,355 | 12/1989 | Trimble | 280/281.1 |

FOREIGN PATENT DOCUMENTS 3430025 2/1986 Fed. Rep. of Germany ...... 280/279

OTHER PUBLICATIONS

J. Wilcockson, Bicycle, 1980, pp. 98, 99, 100.

Primary Examiner—Richard A. Bertsch
Assistant Examiner—Victor E. Johnson
Attorney, Agent, or Firm—Jim Zegeer

[57] ABSTRACT

A light weight aluminum bicycle fork with positive feel and improved control in rough conditions, and is stiffer in torsional stiffness, fore and aft stiffness and side-to-side stiffness and has a higher overall rigidity than prior art forks. A large diameter steering tube has a bearing raceway seat formed therein and a very large diameter head tube has a corresponding bearing raceway seat formed in the lowered end thereof to receive, by way of a press-fit, aircraft-type torque tube bearings. An upper bearing assembly is seated in a raceway seat formed in the upper end of the head tube. Adhesive is used to maintain the bearings in position and prevent their loosening. A pair of large diameter crown miter tubes are welded to the lower end of the steering tube and a pair of large diameter, tapered, round blade tubes are welded to the crown miter tubes and have dropouts welded to the lower ends of the blades. A one-piece aluminum bar, neck and large diameter stem is provided. A tightening wedge and the stem have complementary camming surfaces which are at a shallow angle.

50 Claims, 5 Drawing Sheets

LARGE DIAMETER RIGID LIGHTWEIGHT FORK AND STEERING ASSEMBLY FOR BICYCLES

The present invention relates to improvements in bicycles, more particularly to the front steering assembly, pivot bearings, head set bearing and forks for one-piece handlebar and stem bicycles.

BACKGROUND OF THE INVENTION

In my U.S. Pat. No. 4,500,103 for a HIGH EFFICIENCY BICYCLE FRAME, very large diameter frame tubing is used in a bicycle to resist relatively large torsional and bending forces to produce a bicycle which is very light in weight yet extremely rigid and which, at the same time, provides an extremely good ride. In my U.S. Pat. No. 4,621,827, I disclose a bicycle in which the chainstay tubes are made of unequal rigidity and made in such a way so as to increase the power train efficiency by reducing the magnitude of frame deflection caused by chain stress. The present invention is directed to improvements in the steering and front fork assembly head set bearing and handlebar stem of a bicycle.

The front fork of bicycles typically have been steel with about one inch steerer (e.g., one inch outside diameter steerer post in steel). That is what the headset bearings and all the headset pieces were made to accommodate and the one inch size was limiting in steel. The steel steerer uses a fairly thick wall near the crown in order to make the fork strong enough.

In the bicycle described in my U.S. Pat. No. 4,621,827, the head tube had an outside diameter of about 1.42 inches and an inside diameter of about 1.180 and a center section wall thickness of about 0.065 inches. In order to fit in one inch bearing size constraint in aluminum, a solid bar had to be used and it still is not strong enough because of the small diameter size.

In the past, on mountain bikes and on some road bikes, others have started promoting larger headset sizes with 1¼ inch steering tubes. This is still made of steel in order to make the forks more rigid for better cornering control but they are still essentially about the same weight or heavier. There have been suggestions of aluminum forks. These use a conventional headset and headset bearing units. Hence, the front fork and headset assembly of a bicycle has been the heavy end of the bike and it has been the end that gets the most shock.

There has been introduced to the market a number of front forks which do not have curved blades but which have instead straight blades and there is controversy in the bicycling art concerning whether these straight blades provide harsher riding forks or not. The present invention uses straight blades.

The wheel axle is typically offset forward of the steering axis in order to obtain desirable handling. This offset is called the fork rake. The present invention uses a fork rake of about 1½ inches.

Headset bearing failures are a frequent problem in off-road bicycles. The repeated impacts of off-road use brinell the bearings, loosen the bearing housings in the head tube and the fork crown, loosen and damage the threaded adjustment mechanism. Because of angular misalignment tolerances necessary for inexpensively machined steerer crowns, head tubes and adjusting threads, the traditional bearing assemblies use a cup and cone system, where the radius of curvature of the balls is much smaller than that of at least one of the raceways. This allows the bearing to tolerate angular misalignment and substantially reduces the contact area of the balls, compared to the Super Conrad style bearing—with raceways closely fitted to the balls. The rigidity of the point contact style bearings is thus substantially lower than that of the torque tube type bearing and the load carrying capacity is very much lower. This invention is able to fully utilize the advantages of double-sealed aircraft torque tube type bearings by machining the outside diameter of the steering tube for direct fit and adhesive bonding of the headset bearings to the external surfaces of the steering tube and raceway seats in the head tube, insuring accurate alignment. The ends of the head tube are also precision bored for alignment, and also benefit from direct fit. The threaded adjustment of traditional headsets is another source of trouble. The threads weaken the thin wall steering tube and can break there, especially if the handlebar stem is clamped inside the threads.

THE PRESENT INVENTION

The invention results in a bicycle product which does not require frequent adjustment or services with far greater durability.

The present invention is directed to improvements in the front fork and headset and steering assembly and is particularly directed to the utilization of very large diameter aluminum tubing, a unique headset bearing assembly. According to the invention, the fork blades are greater than about 1½ inch in diameter at the top and about 1⅛ inch at the fork ends down at the tip. They are, in the preferred embodiment, rounded all the way: they are straight about 1⅜ inch diameter for a predetermined distance and then they taper from 1⅜ inch down to about 1⅛ inch and have a wall thickness tapering from about 0.058 inch at the crown miter pieces to about 0.049 inches at the dropouts.

Each blade is mitered at the crown end at an angle and a specially configured crown tubing is mitered to fit up against the blade. It is very difficult to bend the big tube easily and have a tight radius so in the disclosed embodiment the large diameter aluminum tubing is miter cut and welded.

Furthermore, instead of using a conventional headset, a steer tube of about 1⅜ inch diameter is utilized and the part that goes up through the bearings is about 1 9/16 inch so that the steer tube is actually about 1 9/16 inch. The outside diameter of the bearings is about two inches so that the head tube has a diameter of about 2¼ inches at the top and bottom to provide raceway seats to fit the bearings and the bearings are pressed fit and adhesively bonded right to the head tube and to the steering tube. This extremely large diameter head tube along with the large diameter steering tube or post provides a more positive control in rough conditions and is significantly stiffer in both torsional stiffness and fore and aft stiffness and side-to-side stiffness than traditional one inch steerer forks and has essentially the same rigidity as the more recent larger 1¼ inch forks. Moreover, the weight is significantly less than any prior art fork and steering assembly having equivalent rigidity.

The crown piece according to this invention is much larger than that used in a regular fork. With this in mind, if standard headset bearings are used, the front end of the bike is elevated in the air e.g., the stack height is exaggerated. Hence, instead of using a conventional headset, this invention utilizes about 1⅜ inch steer tube and the part that goes through the bearings is about 1 9/16 inch diameter so that you're running in effect a machined to about 1 9/16 inch steer tube up through the bearings and forms a shoulder or raceway seat. The outside diameter of the bearings is about two inches. The upper and lower bearing raceways are further secured in place with an adhesive, preferably an anerobic adhesive but epoxy adhesives can also be used.

Further, according to the invention, the handlebar, neck and stem are unitized and have been designed to accommodate the larger head tube and steer tube discussed above. In a preferred embodiment, the stem is about 1⅜ inches in diameter and has a wall thickness of 0.070 inches and a lighter stem and handlebar. This again adds to the positive feel and control on it and the ride is very good notwithstanding the fact that there is reduced flex in the front forks. It is believed that the large flex in the front fork is not necessary because when going over rough terrain and the front wheel for example, hits a bump, the fork being angled towards it the flexible fork will flex backward and in flexing backward bumping the front end of the bike to jack it up in the air in a pogo-like stick effect. This increases the actual vertical movement over what occurs with a stiff rigid fork as is disclosed in the present application. The stiff fork reduces the degree of bounce so that when you hit a bump, instead of the fork flexing back and raising the front end of the bike and causing it to loose contact with the terrain, the fork does not flex back and the tire seems to deflect more. According to the invention, the tire is made to work harder and the bike stays on track better. That is, the bicycle stays on the ground and control is better and the feel is good and the bicyclist has a feeling of being in control on it, which is very useful. Moreover, the cyclist can go at a higher speed because of having more control, and the traction seems to be better particularly on downhill runs.

The invention has been applied to a mountain bike but it is believed to be just as applicable to road bikes. However, the road bike fork tubing need not be quite as large as the mountain bike, it can be made lighter and use a smaller headset size and smaller blades for cosmetic and air resistance reasons.

The overall effect is to reduce the weight of the front end of the bike by about a pound and a one-quarter to about a pound and one-half. The headset is lighter, the front fork is much lighter and the handlebar, neck and stem are likewise lighter. This is due in part to the fact that it is a one-piece handlebar and stem that weighs no more than other high quality stems on the market. It will be noted that the fork according to this invention, will only fit a bike made with the larger head tube. Hence, the invention takes a special frame and a special head tube to adapt to it. Normally new fittings are required. Aircraft torque tube bearings from the bearing assemblies are used. The threads that are needed to adjust the bearings have been eliminated because the bearings are direct press and adhesive secured bearings and no threads are needed. This type bearing adds to the positive feel and control obtained in bicycles according to the invention because they have a lot more rigidity in the torque tube bearings than normal bike bearings have. Placing the bearings inside the head tube strengthens the bearing joints for the head tube.

SUMMARY OF TECHNICAL FEATURES

I. HEADSET BEARINGS:
Aircraft-type sealed torque tube type bearings,
High load ratings,
High rigidity,
Precision mountings,
Minimum number of assembly components,
Secondary seals,
Large diameter configuration
Both bearings take thrust loads,
Adhesive bonded/press fit, and
Low stack height, allows the large diameter fork crown pieces to be used.

II. FRONT FORK:
Unique design,
Welded construction,
Light weight,
High rigidity,
High strength,
Large diameter steerer,
Large diameter crown,
Large diameter taper blades, and
Taper blade walls.

III. FORK ENDS (DROPOUTS):
Curved, tapered section,
Small locating lip for the blade tube internal diameter,
V-shaped bottom for fast wheel insertion,
Very lightweight, and
Special welding configuration, which just barely catches end of tube to make a clean, smooth, compact weld with good penetration.

IV. HANDLEBAR/STEM:
One-piece assembly,
Welded and heat treated,
Very lightweight,
Large diameter, thin wall neck,
1.75 and 1.625 diameters,
Neck shaped at each end to fit joining tube,
Tapered wall bar, for strength and lightweight
6 mm clamp bolt,
Long wedge, shallow angle (20 degrees or less) provides much better grip surface,
More holding power on the internal surfaces of the steering tube,
Incorporating macaroni-style front brake cable guide,
In large stem diameter, 1.375,
Use 1.375×0.070 stem, lightweight, rigid, strong,
Machined and welded design, smooth top, no sharp edges,
One-piece, lightweight hollow structure,
Long wedge with large surface area, and
Lightweight hollow, thin wall wedge design.

V. HEAD TUBE ASSEMBLY:
Improved bearing support,
Fewer headset components,
Large diameter increases frame rigidity,
Allows large frame tubes to join smoothly, cosmetically, and
Lightweight, thickened only on ends, center wall of about 0.050 inch.

BRIEF DESCRIPTION OF THE DRAWINGS

The above and other objects, advantages and features of the invention will become more apparent when considered with the following specification and accompanying drawings wherein:

FIG. 1 is a front sectional view through the front fork, head tube and headset bearings incorporating the invention

DETAILED DESCRIPTION OF THE INVENTION

Figures 1A, 3:
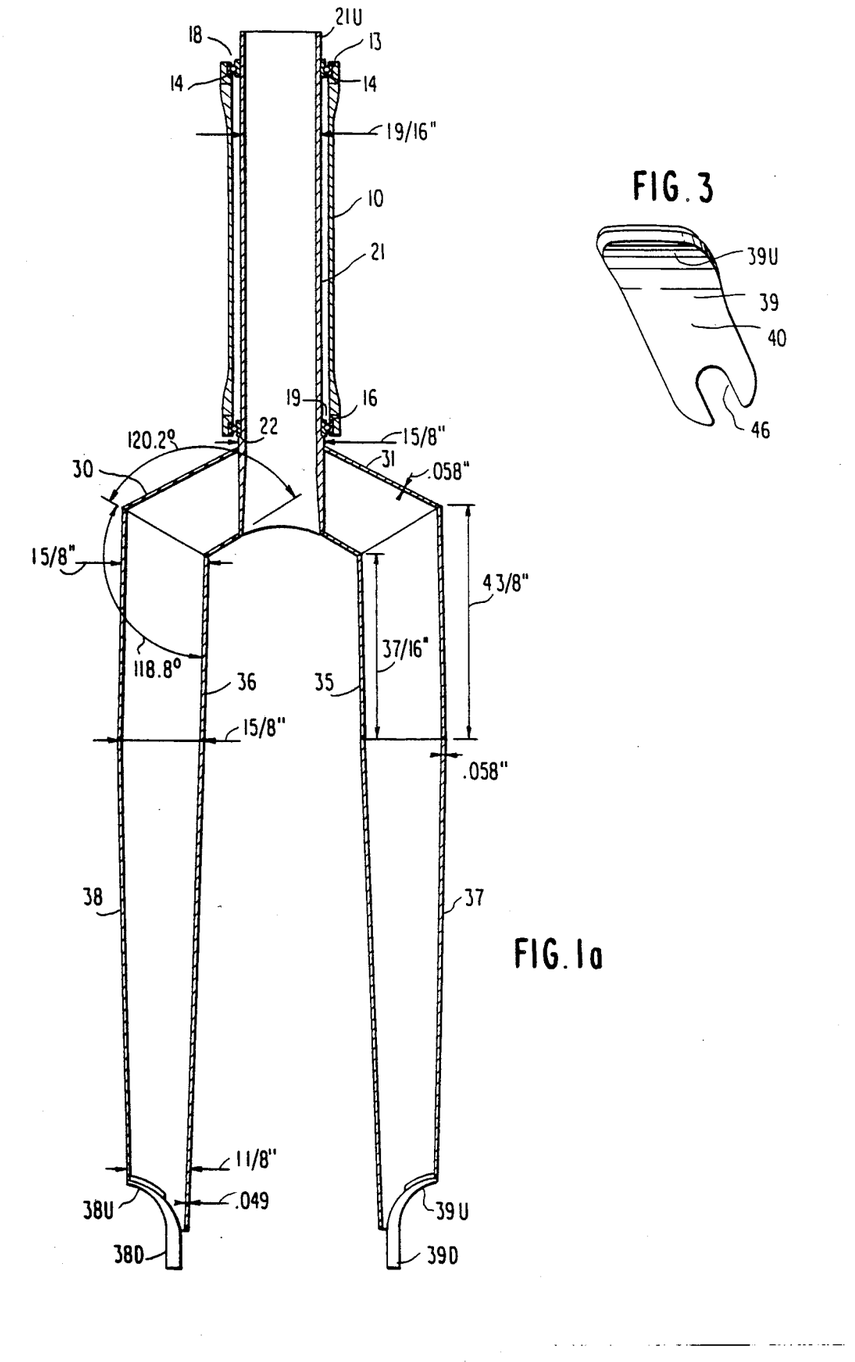
Figure 1B:
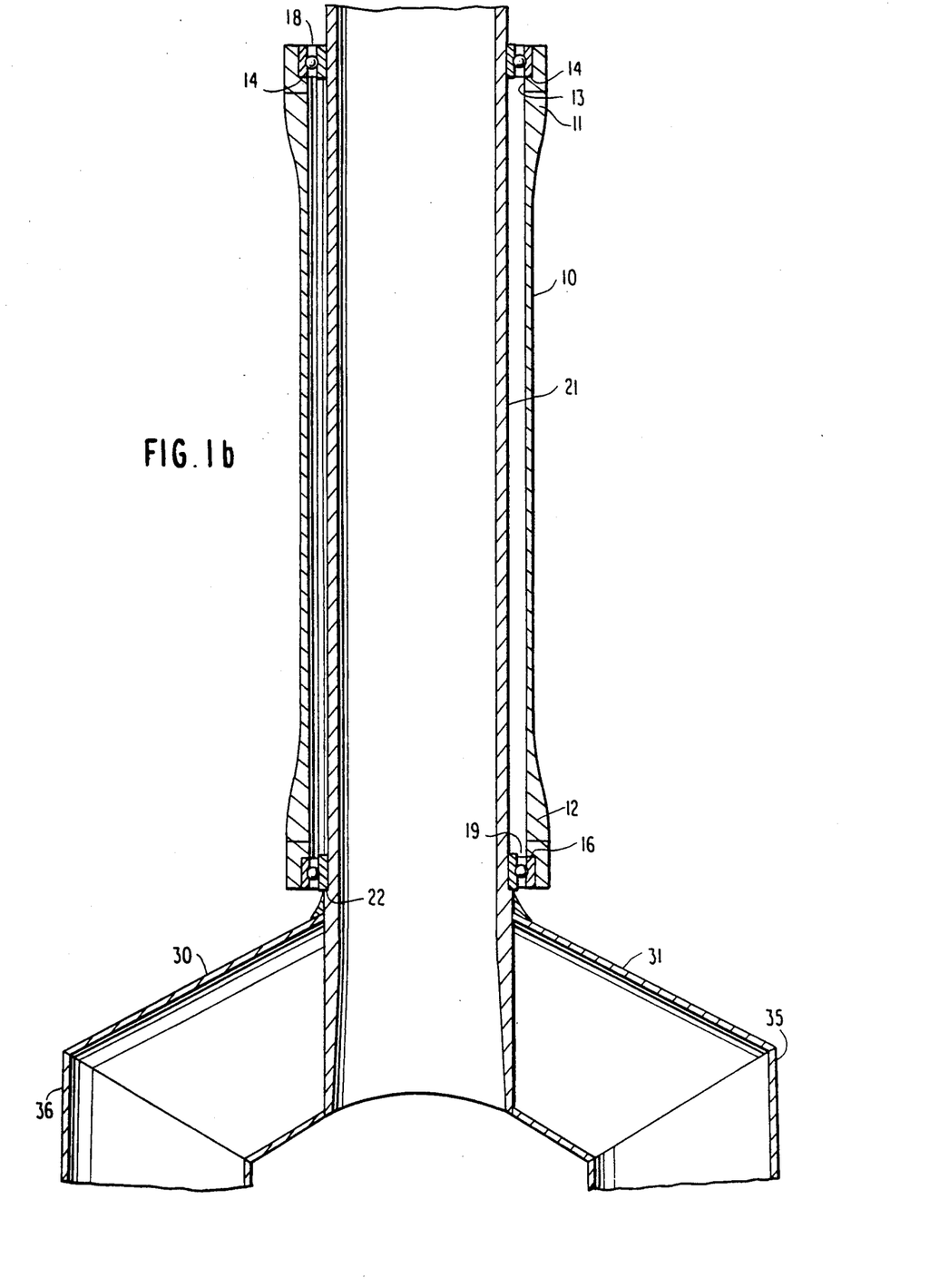
FIG. 1b is an enlarged portion thereof.

Referring now to FIGS. 1a, and 1b, the fork and head tube assembly of the invention is illustrated in section with the head tube 10 having a large internal diameter of about 1⅞ inches (in this preferred embodiment) and uniform throughout the length of the tube and an external diameter or OD of 2 inches in the central body portion thereof and thickened to about 2¼ inches OD at each end. In this embodiment the overall length of the head tube is about 6 inches (which obviously depends on the frame size). The upper end 11 and the lower end 12 of head tube 10 are thicker than the intermediate central body portion with the internal upper edge 13 having an annular shoulder formed therein to form a top raceway seat 14 and the lower end likewise provided with an annular shoulder to form a lower raceway seat 16. Aircraft control or torque tube bearings 18 and 19 are press fit into raceway seats 14 and 16, respectively and an adhesive, preferably an anerobic adhesive, is used to permanently maintain them in place. These are super strong and durable double-sealed aircraft control or torque tube bearings which have a long life and are capable of taking at least 3200 pounds of thrust, 6800 pounds of radial load capacity per bearing. The arrangement just described provides a headset bearing arrangement which does not require any threads which loosen and/or get damaged thereby securing the bearings to the head tube and the steering tube solely by adhesive bonding. It provides a super lightweight headset with a minimum stack height. The adhesive also isolates the steel bearing raceways from the aluminum and seems to help reduce corrosion. It should be noted that years of experience of use of a anerobic adhesive in the bottom bracket bearings has borne this point out.

The front fork (constituted herein by steering tube 21, short crown tube miter pieces 30, 31, straight blade tubes 35, 36 and tapered blade tubes 37, 38 and dropouts 38D, 39D) is made of large diameter, shock absorbing heat treated aluminum construction and provides positive steering control, is ultra light super strong in design and has a large tire clearance. Specifically, the steering tube 21 is extraordinarily large in diameter compared to prior art steering tubes (some of which are as large as 1¼ inch, as noted above). In this invention, the lower end of the steering tube just above the crown portion is provided with a bottom race seat or annular shoulder 22 which seats the inner race of the lower headset bearing 19. Thus, the loading from the front wheel is transmitted through the upper and lower bearings to the head tube, providing a very short stack height. By putting the bearings inside the head tube in the manner illustrated in FIG. 1, and using an adhesive to secure the bearing raceways in place at the head and steering tubes, the bearing joint for the head tube is significantly strengthened and the stack height reduced. The upper end 21U of steering tube 21 may be provided with a large diameter seal member (not shown).

As shown in FIG. 1, the internal lower end of the steering tube is machined to have a slight taper, and the outer diameter of the upper portion of the steerer tube is completely machined.

The lower end of steering tube 21 has welded thereto a pair of laterally extending crown miter pieces 30 and 31. These are large diameter round or ovalled tubes having the same diameter as the upper straight ends 35 and 36 of the fork blades. Crown pieces 30 and 31 have their lower ends miter cut to form the angles indicated and are heliarc welded to the steering tube and to the upper ends of the respective blades 35, 36. The ends of crown miter tubes 30 and 31 are shaped complementary to the curvature of the head tube so that when heliarc welded to the lower end of steering tube 10, it results in a very strong and rigid joint. After the final weldments are made, the fork unit is heat treated to a T6 condition.

In the embodiment illustrated, the length of the straight blade section of about 1⅝ inch aluminum tubing is, on the outer periphery of about 4⅜ inches and, on the inner periphery 3 7/16 inches. At the lower end of the tubes 35 and 36, the upper ends of tapered tubes 37 and 38 are welded thereto. These taper from about 1⅝ inch illustrated down to about 1⅛ inch diameter and have the wall thickness tapering from about 0.058 inches at the crown to about 0.049 inches at the dropouts. These aluminum tubing with their given dimensions provide a very rigid super strong design with shock absorbing heat treated aluminum construction and thereby provides positive steering control with minimum lateral (sideways) flexibility, with maximum cornering and traction and control. It provides super rigid brake mounts (not shown) and a very large tire clearance in an ultra lightweight fork design.

Figure 2A:
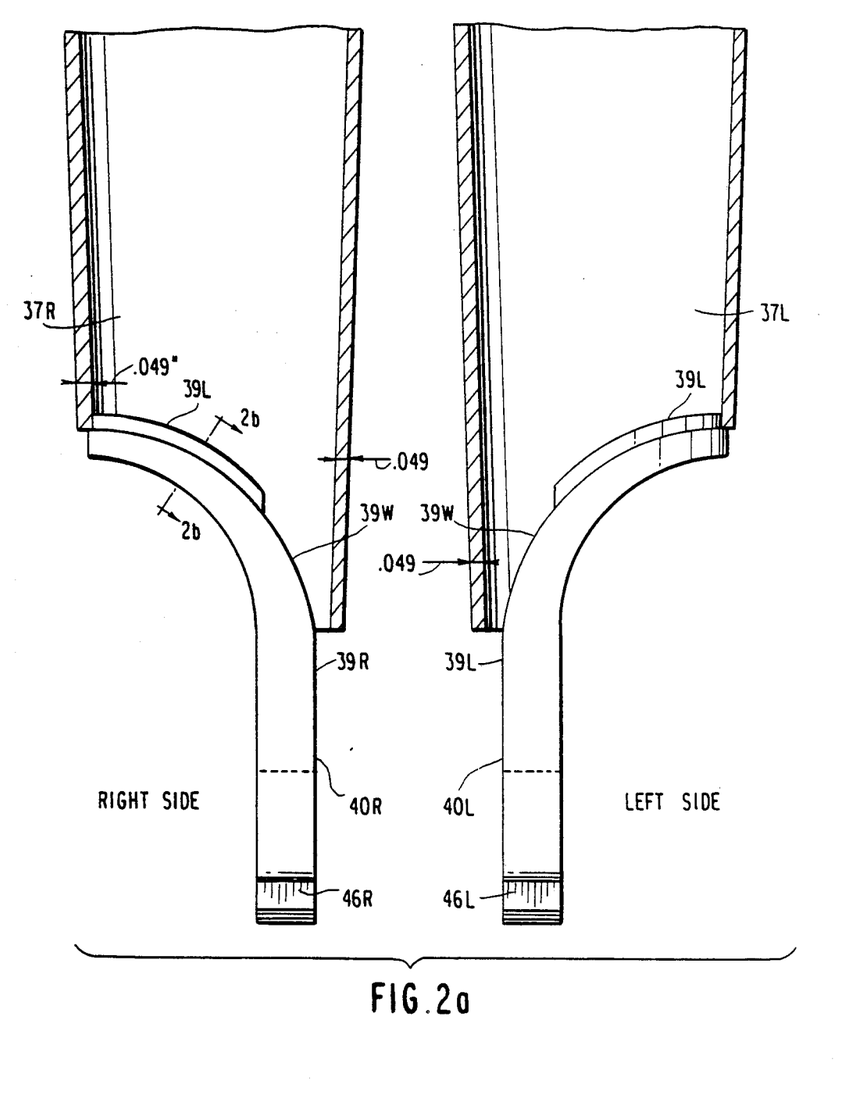
FIG. 2a is a front view of the lower end of the fork blades (the spacing between dropouts has been reduced) showing the dropout incorporating the invention.
Figure 2B:
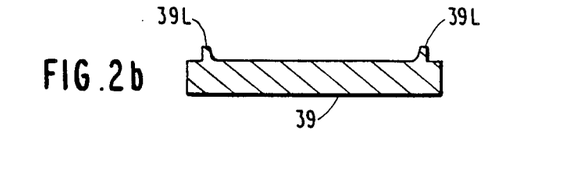
FIG. 2b is a sectional view through lines 6—6 of FIG. 2a, FIG. 3 is a side view of the dropout according to the invention.

The dropout design is illustrated in the front view of FIG. 2a, which is an enlarged view of the dropouts. (In this enlarged view, the left and right blades have been moved together.) It will be noted that the curvature of the upper end 38U, 39U of the drop out members 38D, 39D are curved and the lower ends of tapered tubes 37, 38 are complementary curved to provide, when the dropouts are welded in place, a very strong joint. The dropouts 38D, 39D have curved upper ends which have a "U" shaped positioning ridge or lip 39L and are heliarc welded into the correspondingly curved lower ends of the taper tube portions 37, 38, thus completing the blades for the front fork. U-shaped notches 40 receive the front wheel axle. (The letters "L" and "R" correspond to left and right.)

Figure 4:
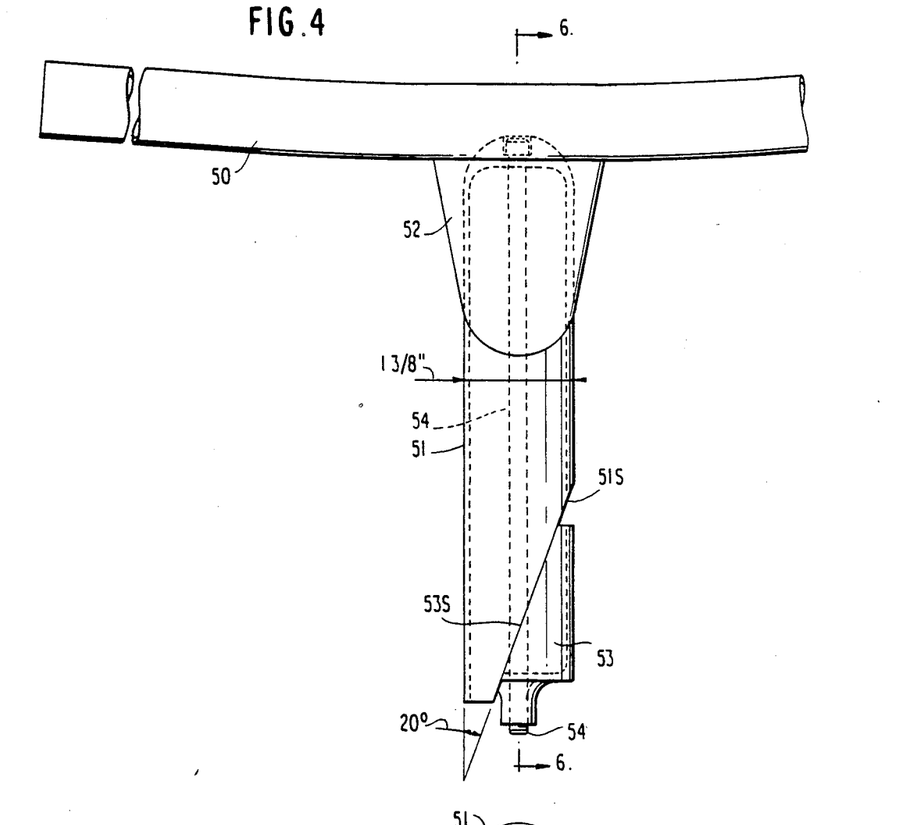
FIG. 4 is a front view of the bar and oversized stem incorporated in the invention.
Figure 5:
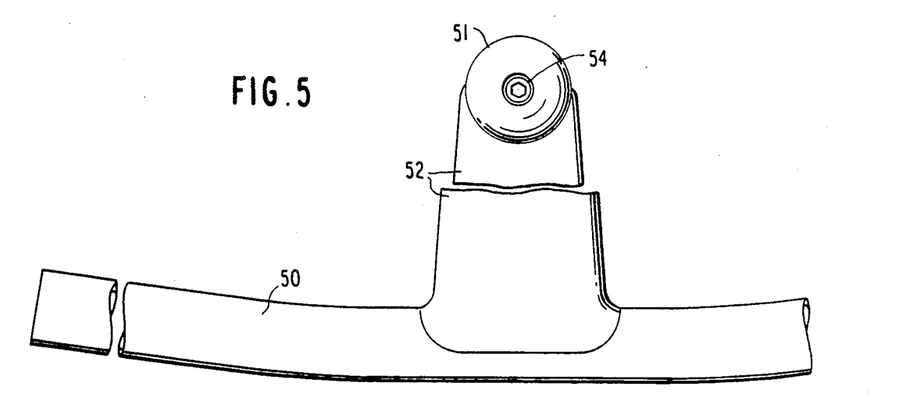
FIG. 5 is a top view of the bar and oversized stem incorporated in the invention.
Figures 6A, 6B:
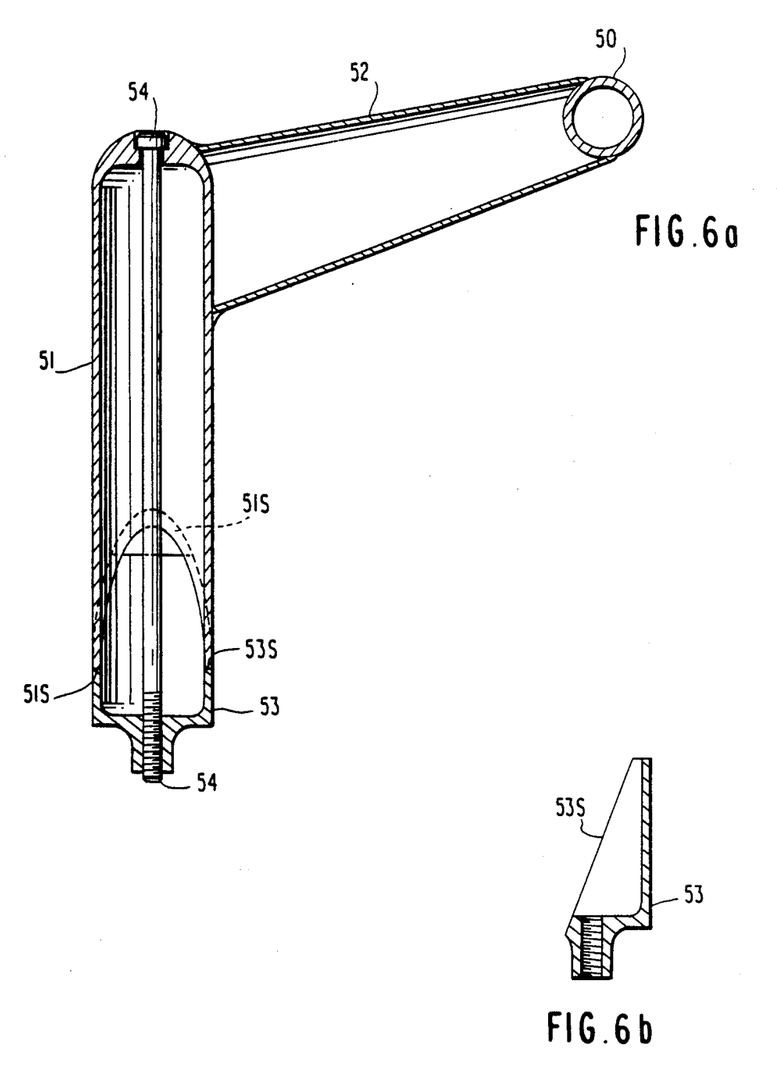
FIG. 6a is an enlarged sectional view through lines 6—6 of FIG. 4.
FIG. 6b illustrates the tightening wedge in section.

FIG. 4 is a front view of the bar 50 (which has tapered walls), stem 51, neck 52 and tightening wedge 53. Neck 52 is shaped at each end joining tube and tapered wall bar 50 for strength and lightweight. The bar 50 is welded to neck 52, which, in turn, is welded to stem 51. These components are made of 6061 aluminum, which is heat treated to a T6 condition after welding. Tightening wedge 53 is made of 7075, T6 aluminum. The camming surfaces 51S and 53S have an angle which is much shallower (20 degrees or less) than in the art. This results in a longer wedge 52 and much better grip surface and more holding power on the internal surfaces of steering tube 21. A small diameter (6 mm) threaded long bolt 54 is used to draw tightening wedge 53 against mutually camming surfaces on the wedge and stem. Note that the stem 51 and tightening wedge 53 are of large diameter and include a longer large diameter clamping wedge for more evenly distributing pressure to provide a tighter grip with less force.

The cam surfaces 51S on stem 54 according to this aspect make the wedge 53 operative over 2 inches in actual clamping length. This is the distance the two mating wedge surfaces 51S and 53S are in contact along the axis. Some wedge parts may extend beyond the bottom edge of the stem but this extra length of contact is not balanced and creates even more highly concentrated stress points higher up and in the preferred embodiment is not desirable. By spreading the load along the axis, the stem is held much more securely, with lower concentration of stress on the steering tube 21. Traditional stems have an effective clamp length of less than one inch, with a typical ramp angle of about 35 degrees.

Another advantage of the longer wedge comes in the bending moments applied to the stem from the handlebars. The side-to-side and front-to-back bending loads need to be rigidly transferred to the fork steerer in order to prevent metal fatigue, fretting, or loosening of the clamped assembly. The standard stem fits into the fork steerer with some degree of play, usually on the order of about 0.005 inch but it has been measured over 0.010 inch in some cases. With play in the top portion of the machined stem, the only place it fits tightly into the fork steerer is at the wedge clamp location, where the wedge is expanded to fit. Thus, the side-to-side flexing of the stem applies a bending moment to the wedge area. The preferred configuration with the 2 inch length of clamp, gives greatly increased resistance to the bending moments then the traditional shorter clamp assemblies. The ramp not passing all the way across the stem diameter also increases the amount of surface actually being applied to clamping forces.

The traditional stem wedge bolts are 8 mm diameter by 1.25 mm thread steel Allen socket head cap screws. Combined with the typical 35 degree wedge angle, the clamping is marginal, as the ramp exerts about a 1.4 multiplier of bolt tension to radial clamping force (under ideal conditions).

The preferred configuration according to this aspect, in the traditional 0.875 inch size, uses a 6 mm diameter by 1 mm thread steel allen socket head bolt 54 combined with a 16 degree wedge angle, and long clamping length. Although the bolt 54 has only 56 percent of the cross sectional area of the traditional size, and thus somewhat reduced strength (it is preferred to use a higher grade of bolt than normal which somewhat compensates) the 16 degree ramp angle of the 0.875 inch model exerts about a 3.5 multiplier of the bolt tension to radial clamping force (under ideal conditions). This gives more than twice the available radial clamping force over the traditional stem and wedge assembly.

The preferred configuration, in the new super size 1.375 inch diameter, also uses the 6 mm diameter stem bolt 54, but with about a 20 degree wedge angle. The 1.375 inch stem 51 utilizes a thin 0.070 wall. The wedge 53 also uses a similar thin wall tubular design, unlike solid wedges of other manufacturers. The thin wall still achieves very high strength because of the large diameter design, but at greatly reduced weight. The 20 degree wedge angle exerts a multiplier of about 2.7 times bolt tension, but the twisting torque required to spin the stem is increased because of the increased moment of the larger stem and fork steerer diameters. The larger 1.375 inch diameter stem 51 has 1.6 more torque resistance for the same radial clamping force as compared to the traditional 0.875 inch diameter stem. This, in combination with the wedge angle multiplier of 2.7 times, gives a torque multiplier of 4.3 (under ideal conditions, i.e., equivalent coefficients of friction, lubrication and so forth). Again, this feature of the invention achieves more than twice the available resistance to torque over the traditional stem and wedge assembly.

The stem clamping must be able to keep the fork steerer from twisting or sliding under normal operating conditions. When the bike is crashed, however, if the stem slips under crashing stress inside of the steerer, it may keep some other damage from occurring. Thus, the ideal stem clamping system would have enough clamping friction to hold it in place, but when stressed unusually hard, be able to slip without damage to either stem or fork.

Traditional stems have caused many fork failures. The highly concentrated pressure of the small wedge or expanding cone in the prior art will expand, bend or even cause the fork steerer to crack. Some of the wedges are made with teeth, serrations or other roughening means in order to effect a more secure grip on the fork steerer. But when the bike is crashed and the clamp is forcibly moved, the teeth gouge the inside of the fork steerer, damaging it. The stems tested that use the surface that bites into the steerer are able to generate enough clamping power in order not to slip under normal off-road conditions (including trails with rocks, logs and roots to ride over). Riding in these conditions requires much more torque to be applied to the fork steerer than would be required on a road bike. In general, the stems of conventional nature with a smooth wedge may slip while riding over a rock or root where some torque is input in order to keep the front tire going in the desired direction. When the stem slips in this condition, the rider generally falls.

The present invention fork, with a fork steerer made of aluminum, would be particularly sensitive to this type of damage. The 1.375 inch diameter stem, with greater than two inches of clamping length, results in stress concentration three to four times less than traditional clamps. The surfaces of the wedge and stem are smooth, and the clamping is more secure than a traditional stem.

The wedge 53 is long, and unlike traditional stems, does not cut completely across the stem, but stops about two thirds of the way across it.

The invention achieves a fine balance of the need for rigid, reliable clamping with the ability to slip under extreme force without damage to the system. This is especially important when using the aluminum alloy fork steerer of the preferred configuration. Further the design achieves very lightweight and high rigidity and strength with the large diameter welded and heat treated one-piece design.

It will be apparent to those skilled in the art that other variations may be made within the scope of the invention. It is intended that the above disclosure shall be read as illustrative.

What is claimed is:

1. A light weight aluminum bicycle steering assembly comprising in combination:
   an aluminum bicycle head tube having a large internal diameter,
   a rigid aluminum alloy fork having steering tube with an outside diameter greater than 1¼ inches, a crown comprised of a pair of large diameter aluminum alloy crown tubes, each crown tube having a pair of mitered ends, a first of said mitered ends having a shape complementary to the shape of said steering tube and welded to the lower end of said steering tube, a pair of blade members having a large diameter upper end mitered complementary to a second of said mitered ends of said crown tubes, and welded thereto, respectively, and a dropout welded at the lower ends of each of said blade members, respectively, a first torque tube bearing, a raceway seat means formed in the lower end of said steering tube, and a corresponding raceway seat means formed in the lower end of said head tube with said first of said torque tube bearings fitted in said raceway seat means, a further raceway seating means formed in the upper end of said head tube and a second torque tube bearing pressed into said further raceway seating means, and an adhesive for bonding said torque tube bearings to said steering tube and in their respective raceway seats, and a large diameter stem welded to a neck piece which in turn is secured to a handlebar, and tightening wedge in said steering tube.

2. The bicycle steering assembly defined in claim 1 wherein said head tube has an outside diameter of about 2 inches along the central portions and about 2¼ inch at the top and bottom ends thereof to accommodate said bearings.

3. The bicycle steering assembly defined in claim 2 wherein said steering tube is about 1 9/16 inch in diameter and further comprising a one piece handlebar neck and stem has the stem thereof in said steering tube, complementary cam surfaces on said stem and said tightening wedge, said cam surfaces having a shallow angle and a bolt for actuating said wedge.

4. The bicycle steering assembly defined in claim 3 wherein each blade member has an upper end portion of predetermined uniform diameter and a lower end portion which tapers to said dropouts.

5. The bicycle steering assembly defined in claim 1 wherein said fork blades are tubing which has a right circular section from the upper ends thereof to said dropouts.

6. The bicycle steering assembly defined in claim 1 wherein said dropouts have a lower member for receiving a front wheel axle and an upper curved securement portion, the lower ends of said blades being curved complementary and welded thereto, and a positioning lip formed on said upper curved securement portion.

7. The bicycle steering assembly defined in claim 1 wherein said bearings are double sealed aircraft-type torque tube bearings.

8. A light weight aluminum bicycle fork for a mountain bicycle to provide a positive feel and improved control in rough conditions, comprising:

a large diameter round steering tube made of aluminum and having an upper end and a lower end and a diameter greater than 1¼ inches, a pair of round, large diameter crown miter tubes, each said crown miter tube having one end thereof mitered and shaped to conform to the curvature of said large diameter round steering tube and being welded by weldments to a side of said lower end of said steering tube, respectively, a bearing raceway seat formed in the surface of said steering tube immediately above the weldments of said crown miter tubes to said lower end of said steering tube, a pair of large diameter blade members, each having an upper mitered end and being welded to an end of one said crown miter tubes, respectively, said large diameter blade members tapering from a diameter equal to the diameter of said crown miter tubes to a smaller diameter at the lower ends thereof, and a pair of dropout members welded to said lower ends, respectively, of said large diameter blade members.

9. The bicycle fork defined in claim 8 wherein said steering tube has an outside diameter of at least about 1 9/16 inches.

10. The bicycle fork defined in claim 8 wherein each said blade members having an upper portion of uniform diameter at the upper end tapering to a lower portion in wall thickness and in diameter.

11. The bicycle fork defined in claim 8 wherein said steering tube crown miter tubes and blade tubes have high circular sections throughout.

12. In a bicycle having a frame with a head tube having upper and lower ends, a front fork having a steering tube having upper and lower ends and passing upwardly coaxially through said head tube and at least a pair of head set bearings, one headset bearing at the upper and lower ends of and between said head and steering tubes, respectively, the improvement wherein the external diameter of said steering tube is precision machined to a predetermined diameter and without threads, each said headset bearings having raceways which are adhesively bonded in place between said head tube and said steering tube at said upper and lower ends, respectively.

13. The bicycle defined in claim 12 including raceway seats machined at the upper and lower ends of said head tube for press fit receiving said head set bearings, respectively.

14. The bicycle defined in claim 12 wherein said bearings are torque tube bearings.

15. The bicycle defined in claim 14 wherein said torque tube bearings are double sealed bearings.

16. The bicycle defined in claim 12, said fork including a crown, welded to said steering tube, including a raceway seat machined intermediate the ends of said steering tube immediately above said crown, and bearing raceway seats machined at the upper and lower ends of said head tube for press fit receiving said bearings, respectively.

17. The bicycle defined in claim 12 including a raceway seat machined in said steering tube intermediate the ends thereof, raceway seats machined at the upper and lower ends of said head tube for receiving said head set bearings, respectively, said head set bearings being double sealed torque tube bearings.

18. The bicycle defined in claim 17 wherein said front fork is made of aluminum and has a crown and a pair of blades, said crown being constituted by a pair of miter tubes each having a pair of mitered ends which are welded to the sides of the lower end of said steering tube, respectively, said pair of blades having mitered ends welded to the respective ends of said miter rubes, a dropout member welded to the lower ends, respectively of each of said blades and a positioning lip on the surface of said dropout member.

19. The bicycle defined in claim 12 wherein said front fork is made of aluminum and has a crown and a pair of blades, said crown being constituted by a pair of miter tubes, each having a pair of mitered ends which are welded to the sides of the lower end of said steering tube, respectively, said pair of blades having mitered ends welded to the ends of said miter tubes, respectively, and a dropout welded to the lower ends of said blades.

20. The bicycle defined in claim 19 including an aluminum handlebar and a neck, said handlebar being welded to said neck and said neck in turn being welded to the upper end of said stem.

21. The bicycle defined in claim 22 wherein said shallow angle is about 20 degrees.

22. The bicycle defined in claim 19 wherein said head tube has an outside diameter of about 2 inches, said steering tube has an outside diameter of about 1 9/16 inches, said stem has a diameter of about 1⅜ inches, a tightening wedge including complementary coacting straight, shallow angled cam surfaces on the lower end of said stem and upper end of said tightening wedge and a bolt for drawing said tightening wedge upwardly so that said cam surfaces cause internal gripping of said steering tube by said stem and tightening wedge.

23. The bicycle defined in claim 22 wherein said head tube has a wall thickness of about 0.050 inch and is thickened at the ends.

24. A light weight bicycle steering assembly comprising in combination:
   an bicycle head tube,
   a rigid fork having a steering tube free of threads, a crown welded to the lower end of said steering tube, a pair of blade members welded to the sides of said crown, respectively, and a dropout welded at the lower ends of each of said blade members, respectively,
   a first bearing set, raceway seat means formed in the lower end of said steering tube, and a corresponding raceway seat means formed in the lower end of said head tube with said first bearing set fitted in said raceway seat means,
   a further raceway seating means formed in the upper end of said head tube and a second bearing set fitted into said further raceway seating means, and
   an adhesive for bonding said bearings to said steering tube and in their respective raceway seats, and
   a bicycle handlebar, neck and stem secured to said steering tube.

25. The bicycle steering assembly defined in claim 24 wherein said steering and head tubes are aluminum alloy and said head tube has an outside diameter of about 2 inches along the central portions and about 2⅛ inch at the top and bottom ends thereof.

26. The bicycle steering assembly defined in claim 25 wherein said steering tube is about 1 9/16 inch in diameter, a one-piece handlebar neck and stem has the stem thereof in said steering tube, a tightening wedge, complementary cam surfaces on said stem and said tightening wedge, said cam surfaces having a shallow angle and a bolt for actuating said wedge.

27. The bicycle steering assembly defined in claim 26 wherein each blade member has an upper end portion of predetermined uniform diameter and a lower end portion which tapers to said dropouts.

28. The bicycle steering assembly defined in claim 24 wherein said fork blades are tubing which has a right circular section from the upper ends thereof to said dropouts.

29. The bicycle steering assembly defined in claim 24 wherein said dropouts have a lower member for receiving a front wheel axle and an upper curved securement portion, the lower ends of said blades being curved complementary and welded thereto, and a positioning lip formed on said upper curved securement portion.

30. The bicycle steering assembly defined in claim 24 wherein said bearing sets are aircraft-type sealed double sealed torque tube bearings.

31. In a lightweight bicycle having a frame with a head tube, a front fork having a steering tube passing upwardly coaxially through said head tube and at least a pair of head set bearings, one headset bearing at the upper and lower ends of and between said head and steering tubes, respectively, the improvement wherein the external diameter of said steering tube is greater than 1¼ inches and the exterior surface is machined smooth, each said headset bearings having raceways which are fitted to and adhesively bonded in place between said head tube and said machined smooth steering tube.

32. The bicycle defined in claim 31 including raceway seats machined at the upper and lower ends of said head tube for receiving said head set bearings, respectively.

33. The bicycle defined in claim 31 wherein said head set bearings are aircraft-type torque tube bearings.

34. The bicycle defined in claim 33 wherein said head set bearings are double sealed bearings.

35. The bicycle defined in claim 31, said fork including a crown, welded to said steering tube, including a raceway seat machined intermediate the ends of said steering tube immediately above said crown, and bearing raceway seats machined at the upper and lower ends of said head tube for receiving said head set bearings, respectively.

36. The bicycle defined in claim 31 including a raceway seat machined in said steering tube intermediate the ends thereof, raceway seats machined at the upper and lower ends of said head tube for receiving said head set bearings, respectively, said head set bearings being double sealed torque tube bearings.

37. The bicycle defined in claim 36 wherein said front fork is made of aluminum and has a crown and a pair of blades, said crown being constituted by a pair of round miter tubes each having a pair of mitered ends which are welded to the sides of the lower end of said steering tube, respectively, said pair of blades having mitered ends welded to the respective ends of said round miter rubes, dropout member welded to the lower ends, respectively of said blades and a positioning lip on the surface of said dropout.

38. The bicycle defined in claim 31 wherein said head tube has an outside diameter of about 2 inches, said machined smooth steering tube has an outside diameter of about 1 9/16 inches, said stem has a diameter of about 1⅜ inches, a tightening wedge including complementary coacting straight, shallow angled cam surfaces on the lower end of said stem and upper end of said tightening wedge and a bolt for drawing said tightening wedge upwardly so that said cam surfaces cause internal gripping of said steering tube by said stem and tightening wedge.

39. The bicycle defined in claim 38 wherein said bolt is about 6 mm and said shallow angle is about 20 degrees or less.

40. The bicycle defined in claim 31 including an aluminum handlebar and a neck, said handlebar being welded to said neck and said neck in turn being welded to the upper end of said stem.

41. A method of assembling a bicycle steering assembly for a bicycle, comprising providing a frame with a head tube, providing a front fork having a steering tube without threads for passing upwardly and coaxially through the head tube, said head and steering tubes having upper and lower ends, and bearing raceway seats formed at said lower ends of said head and steering tubes and a bearing raceway seat formed in said upper end of said head tube, and bearing sets having raceways and adhesively bonding said bearing sets in said raceway seats and on said steering tube so that said front fork is secured to said head tube and frame by said adhesive bonding.

42. A bicycle comprising a frame with a head tube, a front fork having a steering tube for passing upwardly and coaxially through the head tube, said head and steering tubes having upper and lower ends with the upper end of said steering tube being smooth, and bearing raceway seats formed at said lower ends of said head and steering tubes and a bearing raceway seat formed in said upper end of said head tube, upper and lower bearing sets and means adhesively bonding said bearing sets in said raceway seats, respectively and on the smooth upper end of said steering tube so that said front fork is secured in said head tube and frame solely by said adhesive bonding.

43. A bicycle comprising a frame with a head tube, a front fork having a steering tube for passing upwardly and coaxially through the head tube, said steering tube having an outside diameter greater than $1\frac{1}{4}$ inches, said head and steering tubes having upper and lower ends, and bearing raceway seats formed at said lower ends of said head and steering tubes and a bearing raceway seat formed in said upper end of said head tube, upper and lower bearing sets and means positioning and adhesively bonding said bearing sets having raceways in said raceway seats and on said steering tube so that said front fork is secured to said head tube and frame solely by said adhesive bonding.

44. In a bicycle having a frame with a head tube, a steering assembly including a front fork having a steering tube passing upwardly and coaxially through said head tube, said head and steering tubes having upper and lower ends, raceway seats formed at said lower ends of said head and steering tubes and a raceway seat formed in the upper end of said steering tube, bearing sets having raceways fitted in said raceway seats, and a handlebar joined to a neck and stem with said stem positioned in said steering tube and means for retaining said stem in said steering tube, the improvement comprising adhesive means bonding said bearing sets having raceways in said raceway seats and on said steering tube so that said front fork is secured in said head tube solely by said adhesive means.

45. The bicycle defined in claim 44 wherein said frame and said front fork are made of a lightweight metal and said steering tube has a diameter greater than $1\frac{1}{4}$ inches.

46. The bicycle defined in claim 44 wherein said bearing sets are aircraft-type sealed torque tube bearings, said steering assembly having a low stack height.

47. The bicycle defined in claim 44 wherein said front fork has a pair of crown tubes, having upper and lower ends, said crown tubes being welded at their upper ends to said steering tube and a pair of blades having upper and lower ends welded at their upper ends to the lower ends of said pairs of crown tubes, respectively, and a pair of dropouts, one welded to the lower ends of said blades, respectively, said dropouts having a curved tapered section.

48. The bicycle defined in claim 46 wherein said dropouts have a locating lip corresponding in part to an internal diameter of said lower ends of said blades.

49. The bicycle defined in claim 43 wherein said handlebar, neck and stem are welded together and heat treated.

50. The bicycle defined in claim 43 wherein said means for retaining said stem in said steering tube comprises a cam surface formed on said stem at a shallow angle of 20 degrees or less and a wedge having a cooperating cam surface.

* * * * *